United States Patent
Wang et al.

(10) Patent No.: US 9,819,438 B2
(45) Date of Patent: Nov. 14, 2017

(54) METHOD FOR CALCULATING SPECTRUM TIMING CHANNEL, PATH CALCULATING ELEMENT AND NODE

(71) Applicant: Xi'an Zhongxing New Software Co., Ltd., Xi'an, Shaanxi (CN)

(72) Inventors: Qilei Wang, Shenzhen (CN); Daowei Zhang, Shenzhen (CN)

(73) Assignee: Xi'an Zhongxing New Software Co., Ltd., Shaanxi (CN)

( * ) Notice: Subject to any disclaimer, the term of this patent is extended or adjusted under 35 U.S.C. 154(b) by 0 days.

(21) Appl. No.: 14/412,247

(22) PCT Filed: Jun. 24, 2013

(86) PCT No.: PCT/CN2013/077735
§ 371 (c)(1),
(2) Date: Dec. 31, 2014

(87) PCT Pub. No.: WO2013/185647
PCT Pub. Date: Dec. 19, 2013

(65) Prior Publication Data
US 2015/0171989 A1 Jun. 18, 2015

(30) Foreign Application Priority Data
Jul. 6, 2012 (CN) .......................... 2012 1 0233709

(51) Int. Cl.
*H04J 14/02* (2006.01)
*H04L 12/721* (2013.01)
(Continued)

(52) U.S. Cl.
CPC .......... *H04J 14/0241* (2013.01); *H04L 45/02* (2013.01); *H04L 45/42* (2013.01);
(Continued)

(58) Field of Classification Search
CPC ...... H04J 14/0241; H04L 45/02; H04L 45/42; H04L 45/62
(Continued)

(56) References Cited

U.S. PATENT DOCUMENTS

2002/0159411 A1* 10/2002 Airy .................... H04L 12/5693
370/330
2005/0033832 A1* 2/2005 Hass ................... G06F 12/0813
709/220
(Continued)

FOREIGN PATENT DOCUMENTS

| CN | 101729385 A | 6/2010 |
|---|---|---|
| CN | 102377674 A | 3/2012 |
| EP | 2341672 A1 | 7/2011 |

OTHER PUBLICATIONS

Vasseur ["Path Communication Element (PCE) Communication Protocol (PCEP)" Network Working Group].*
(Continued)

*Primary Examiner* — Oommen Jacob
(74) *Attorney, Agent, or Firm* — Banner & Witcoff, Ltd.

(57) ABSTRACT

A method for computing a frequency slot channel, a path computation element and a node are disclosed. The method includes: when a frequency slot channel needs to be established, an ingress node sending to a path computation element a path computation request message which carries spectrum resource information needed for establishing the frequency slot channel; according to the received spectrum resource information sent by the ingress node, the path computation element computing out the frequency slot channel by combining of topology information of a network and spectrum resource information of each node in the network. The path computation element includes a receiving module and a computing module. When working as an ingress node in a process of establishing a frequency slot channel, the
(Continued)

node includes a message construction module and a sending module.

13 Claims, 2 Drawing Sheets

(51) Int. Cl.
  H04Q 11/00 (2006.01)
  H04L 12/717 (2013.01)
  H04L 12/751 (2013.01)
(52) U.S. Cl.
  CPC ......... H04L 45/62 (2013.01); H04Q 11/0066 (2013.01); H04Q 2011/009 (2013.01); H04Q 2011/0086 (2013.01)
(58) Field of Classification Search
  USPC .............................................. 398/49, 48, 43
  See application file for complete search history.

(56) References Cited

U.S. PATENT DOCUMENTS

| | | | | |
|---|---|---|---|---|
| 2007/0255894 | A1* | 11/2007 | Hessel | G06F 9/30036 711/105 |
| 2008/0175199 | A1* | 7/2008 | Shao | H04W 28/26 370/329 |
| 2010/0120359 | A1* | 5/2010 | Agarwal | H04B 7/18539 455/12.1 |
| 2010/0313082 | A1* | 12/2010 | Kim | H04L 12/6418 714/57 |
| 2011/0090791 | A1* | 4/2011 | Udupi | H04L 45/04 370/231 |
| 2011/0236013 | A1* | 9/2011 | Gazzola | H04J 14/0258 398/5 |
| 2014/0044431 | A1* | 2/2014 | Hussain | H04J 14/0227 398/79 |
| 2014/0186020 | A1* | 7/2014 | Handelman | H04J 14/0268 398/2 |
| 2014/0328587 | A1* | 11/2014 | Magri | H04Q 11/0066 398/26 |
| 2014/0341572 | A1* | 11/2014 | Sambo | H04J 14/0257 398/48 |
| 2015/0023205 | A1* | 1/2015 | Vasseur | H04L 45/42 370/254 |
| 2015/0139652 | A1* | 5/2015 | Bottari | H04J 14/0256 398/79 |
| 2015/0171989 | A1* | 6/2015 | Wang | H04L 45/42 398/49 |

OTHER PUBLICATIONS

Hussain ["Generalized Label for Super—Channel Assignment on Flexible Grid" IETF 82].*
International Search Report of PCT/CN2013/077735, dated Sep. 26, 2013.
ITU-T Recommendation G.694.1 v2.0; Series G: Transmission Systems and Media, Digitial Systems and Networks; Transmission media and optical systems characteristics—Characteristics of optical systems, Jun. 15, 2012, pp. 1-7.
Series G: Transmission Systems and Media, Digital Systems and Networks—Transmission Media and Optical Systems Characteristics—Characteristics of Optical Systems; Spectral grids for WDM Applications: DWDM Frequency Grid, Feb. 2012, 16 pages.
Guenter Grueel ZTE Corporation, Draft Revised Recommendation ITU-T G.872, study period 2009-2012, International Telecommunication Union, Geneva, Mar. 29, 2012, 46 pages.
Supplementary European Search Report of EP 13803630, dated Dec. 11, 2015.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Object-Class  |  Type  |Res|P|I|        Object length (byte)  |
+-+-+-+-+-+-+-+-+-+-+-+-+-+-+-+-+-+-+-+-+-+-+-+-+-+-+-+-+-+-+-+-+
|                     m                                          |
+-+-+-+-+-+-+-+-+-+-+-+-+-+-+-+-+-+-+-+-+-+-+-+-+-+-+-+-+-+-+-+-+
``` though, signal exchange is performed in unit of wavelength, and an exchange matrix would be specific to the level of each optical channel (OCh) signal to exchange and filter the wavelengths. The new spectrum planning and management scheme is proposed in the latest version of a G.872 optical transport network architecture, wherein a concept of frequency slot is introduced.

METHOD FOR CALCULATING SPECTRUM TIMING CHANNEL, PATH CALCULATING ELEMENT AND NODE

TECHNICAL FIELD

The present document relates to the field of an optical transport network, and more particularly, to a method for computing a frequency slot channel, a path computation element and a node.

BACKGROUND OF THE INVENTION

In the existing optical transport network architecture, signal exchange is performed in unit of wavelength, and an exchange matrix would be specific to the level of each optical channel (OCh) signal to exchange and filter the wavelengths. The new spectrum planning and management scheme is proposed in the latest version of a G.872 optical transport network architecture, wherein a concept of frequency slot is introduced.

The frequency slot is a concept in the management sense, and does not bring change to the existing transport plane signal. The frequency slot means that one or more OCh signals act as a whole to be exchanged and forwarded, which represents a group of OCh signals and can be implemented by configuring a piece of continuous spectrum on each node. A frequency slot channel is constituted by a cascade of media element frequency slots between two nodes. The frequency slot channel can contain one or more OCh signals and can facilitate network management, and the frequency slot can be exchanged as a single piece of spectrum. Compared to a single wavelength exchange, a transmission distance can be maximized. Each frequency slot channel is an optical media path and can be represented with a central frequency and spectrum width. As shown in FIG. 1, the available spectrum of one optical fiber can be divided into a plurality of frequency slots, and each frequency slot can contain one or more OCh signals.

Modeling from the management point of view, one frequency slot channel can be used to transport one or more OCh signals, the frequency slot channel can be used as a service layer of the OCh signals, while an OCh layer works as a client layer of the frequency slot channel. The established frequency slot channel can work as Forwarding Adjacency of the OCh layer and as a link for the OCh layer, which is used by the OCh layer for path establishment. The established frequency slot channel publishes in the OCh layer the available spectrum within the channel through routing, and a path computation element in the OCh layer establishes an end-to-end path according to the received information of available spectrum.

In a scene of centralized path computation, for example, before establishing a frequency slot channel, a path establishment module in an ingress node sends a Path Computation Request (PCReq) message to a path computation module in the path computation element (PCE) firstly, and requires the latter to compute an end-to-end frequency slot channel with the appropriate spectrum.

In a scene of conventional path establishment, it is required to carry bandwidth information of a label switched path requested to be established in order to establish the label switched path with the corresponding bandwidth resource, wherein the bandwidth information is information of the maximum number of bytes which can be transported per second. But in the process of establishing the frequency slot channel, it needs to consider constraint information of the spectrum resource, that is, the available spectrum information between the highest frequency and the lowest frequency that can be used in the spectrum, or the spectrum width information.

The spectrum width, as a kind of resource constraint information which is different from the bandwidth and needs to be considered, is not defined to be carried through the similar object in the existing Path Computation Element Protocol (PCEP), thus it is not possible to use the existing PCEP protocol assisting in the path computation element to compute a frequency slot channel.

SUMMARY OF THE INVENTION

The purpose of the embodiments of the present document is to provide a method for computing a frequency slot channel, a path computation element and a node, to overcome the defect that the existing PCEP message cannot be used to compute an available frequency slot channel.

To solve the abovementioned problem, the embodiment of the present document provides the following technical solution.

A method for computing frequency slot channel comprises:

when a frequency slot channel needs to be established, an ingress node sending to a path computation element a path computation request message which carries spectrum resource information needed for establishing the frequency slot channel;

according to the received spectrum resource information sent by the ingress node, the path computation element computing out the frequency slot channel by combining of topology information of a network and spectrum resource information of each node in the network.

Alternatively, the method further comprises:

after computing the frequency slot channel, the path computation element notifying the ingress node of information of the frequency slot channel.

Alternatively, the step of the path computation element notifying the ingress node of the information of the frequency slot channel comprises:

the path computation element sending the ingress node a path computation reply message which carries information of the frequency slot channel.

Alternatively, the information of the frequency slot channel comprises: routing information of the frequency slot channel and spectrum resource information used for path establishment.

Alternatively, the spectrum resource information used for the path establishment comprises: central frequency and spectrum width information of the frequency slot channel.

Alternatively, in the path computation request message, the spectrum resource information needed for establishing the frequency slot channel is carried via a spectrum width object; wherein, the spectrum width object comprises:

a field of Object-Class, used for identifying a path computation element protocol (PCEP) object type, and its specific numerical value is selected from any one of values which are not currently assigned;

a field of Object Type, when Object Type=1, it indicates the requested spectrum width;

when Object Type=2, it indicates requesting to reselect a better path;

a field of m: its value is used for indicating the spectrum width of the requested frequency slot channel, and the requested spectrum width is a product of 12.5 GHz and m.

A path computation element comprises a receiving module and a computing module, wherein:

the receiving module is configured to: receive a path computation request message sent by an ingress node, wherein, the path computation request message carries spectrum resource information needed for establishing a frequency slot channel requested by the ingress node;

the computing module is configured to: according to the spectrum resource information sent by the ingress node and received by the receiving module, compute the frequency slot channel by combining of topology information of a network and spectrum resource information of each node in the network.

Alternatively, the path computation element further comprises a sending module, wherein:

the sending module is configured to: notify the ingress node of information of the frequency slot channel after the computing module computes out the frequency slot channel.

Alternatively, the sending module is configured to notify the ingress node of the information of the frequency slot channel in the following manner:

the sending module sending to the ingress node a path computation reply message which carries the information of the frequency slot channel.

Alternatively, the information of the frequency slot channel comprises: routing information of the path and spectrum resource information used for path establishment; wherein the spectrum resource information used for path establishment comprises: central frequency and spectrum width information of the frequency slot channel.

A node comprises a message construction module and a sending module when working as an ingress node in a process of establishing a frequency slot channel, wherein:

the message construction module is configured to: when a frequency slot channel needs to be established, construct a path computation request message which carries spectrum resource information needed for establishing the frequency slot channel;

the sending module is configured to: send the path computation request message constructed by the message construction module to a path computation element.

Alternatively, in the path computation request message, the spectrum resource information needed for establishing the frequency slot channel is carried via a spectrum width object; wherein, the spectrum width object comprises:

a field of Object-Class, used for identifying a path computation element protocol (PCEP) object type, and its specific numerical value is selected from any one of values which are not currently assigned;

a field of Object Type, when Object Type=1, it indicates the requested spectrum width;

when Object Type=2, it indicates requesting to reselect a better path;

a field of m: its value is used for indicating the spectrum width of the requested frequency slot channel, and the requested spectrum width is a product of 12.5 GHz and m.

With the abovementioned technical solution, the path computation element can compute a frequency slot channel with the determined central frequency according to the spectrum width information needed for path establishment.

PREFERRED EMBODIMENTS OF THE INVENTION

To make the objectives, technical solutions and advantages of the present document more apparent, hereinafter the embodiments of the present document will be described in detail in conjunction with the accompanying drawings. It should be noted that, in the case of no conflict, the embodiments of the present application and features in these embodiments may be arbitrarily combined with each other.

Aiming at the current situation in which no object is defined in the current protocols to carry spectrum width information, the present embodiments extend the PCEP object and define a spectrum width object, and the requested spectrum resource information, i.e., the spectrum width information which needs to apply, is described by carrying this spectrum width object in a PCReq message, so that a path computation module in a PCE can compute one suitable end-to-end path according to the spectrum width information.

Figure 1:
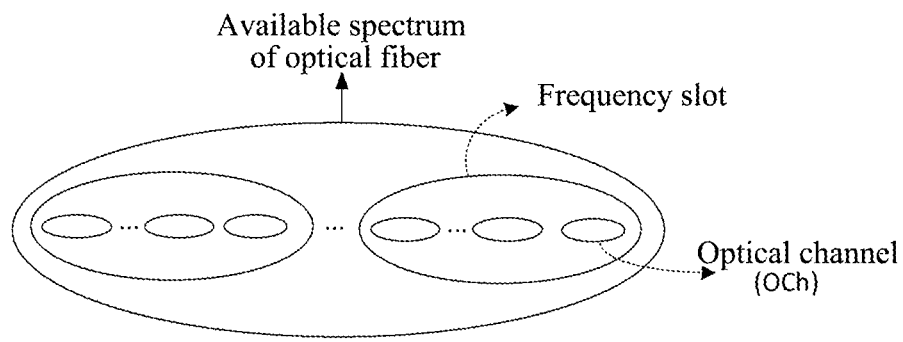
FIG. 1 is an architectural diagram of an optical transport network in the related art.
Figure 2:
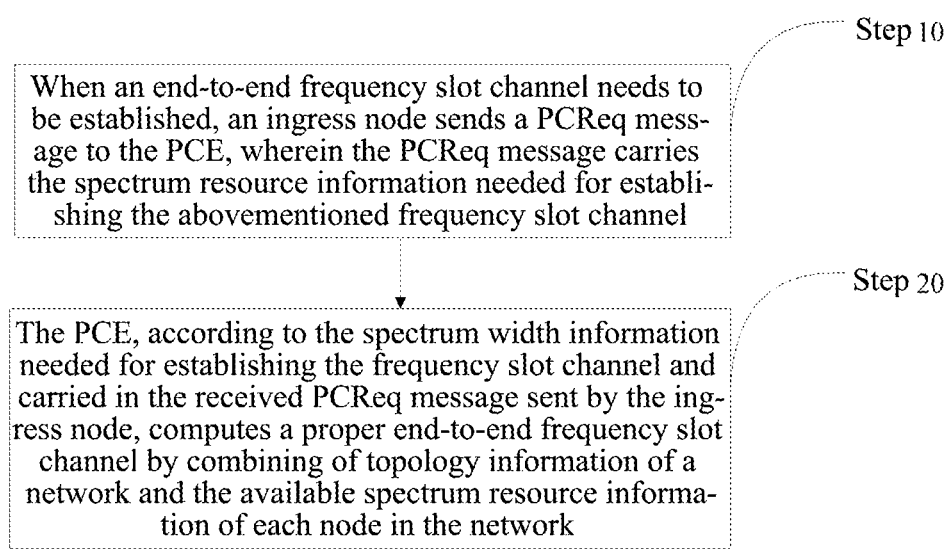
FIG. 2 is a flow chart of a method for computing a frequency slot channel in accordance with an embodiment of the present document.
Figures 3, 4:
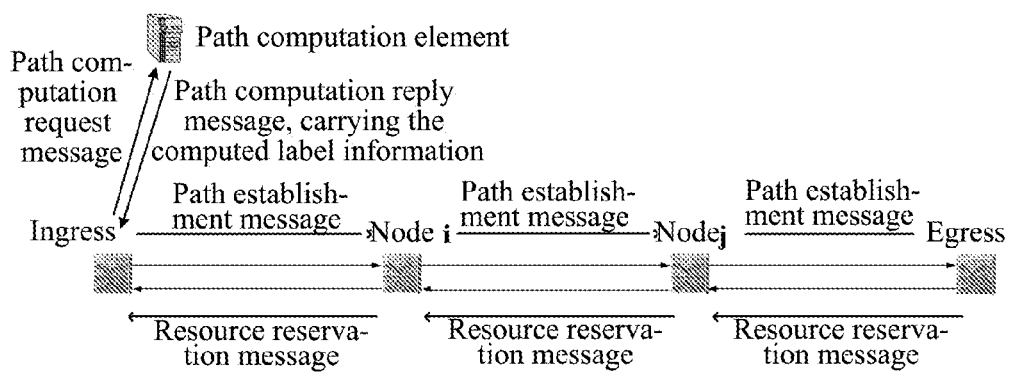
FIG. 3 is a schematic diagram of a spectrum width object in accordance with an embodiment of the present document.
FIG. 4 is a flow chart of a path computation requesting method in accordance with an embodiment of the present document.

In the present embodiment, a method for computing a frequency slot channel, used in the optical transport network, is shown in FIG. 2 and comprises the following steps:

in step 10, when an end-to-end frequency slot channel needs to be established, an ingress node, which works as a path computation client (PCC), sends to the PCE a PCReq message which carries the spectrum resource information, that is, the spectrum width information, needed for establishing the abovementioned frequency slot channel, wherein the spectrum width information is carried in the spectrum width object defined below, as shown in FIG. 3;

in step 20, after computing the suitable end-to-end frequency slot channel by combining of the topology information of a network and the available spectrum resource information of each node in the network and according to the spectrum width information which is needed for establishing the frequency slot channel and carried in the received PCReq message sent by the ingress node, the PCE notifies the ingress node of the information of the computed frequency slot channel.

Wherein, the information of the computed frequency slot channel comprises the determined spectrum resource information needed for path establishment; and the spectrum resource information comprises a central frequency and spectrum width information of the abovementioned frequency slot channel.

As shown in FIG. 3, the meaning of each field in the spectrum width object defined in the present embodiment is as follows:

Object-Class: used for identifying a PCEP object type, and its specific value can be selected from any one of the values which is not assigned currently;

Object type: two object types are defined in the present embodiment, comprising:

when Object Type=1, it indicates the requested spectrum width;

when Object Type=2, this type of object is used for carrying the spectrum width of the existing frequency slot channel, in this case the frequency slot channel is being requested to be re-optimized, and a better path is requested to be reselected;

For example, the spectrum width of an existing path cannot meet requirements, and at this time, it needs to request for establishing another path with a wider spectrum width, then the object with object type=2 can be used to carry the spectrum width of the existing path;

m (16 bits): its value is an integer, and it is used for indicating the requested spectrum width of the frequency slot channel, and the requested spectrum width=12.5 GHz*m;

The definitions of other fields are the same as those in RFC5440 and will not be repeated herein.

As shown in FIG. 4, a method for computing the frequency slot channel specifically comprises the following steps.

In step 1: the ingress node for the path establishment works as the PCC, its path establishment module sends the PCReq message to the path computation module in the PCE, and the purpose is to let the PCE compute a suitable frequency slot channel from the ingress node to the egress node, wherein the spectrum width object defined in the present embodiment is carried in the PCReq message and used to describe the spectrum width of the frequency slot channel which is requested for establishment.

In step 2: the path computation module in the PCE computes one suitable frequency slot channel from the ingress node to the egress node based on the topology information and the available spectrum information of each node in the region, wherein an explicit route object (ERO) is used for carrying an explicit label, in which the label information comprises the central frequency and spectrum width information of the frequency slot channel; and then sends a path computation reply (PCRep) message to the path establishment module in the ingress node.

Assuming the computed path is Ingress-Node i-Node j-Egress, the information carried in the ERO is (Ingress, Label1, Node i, Label 2, Node j, Label 3, Egress, Label 4); wherein, Label 1, Label 2, Label 3 and Label 4 respectively indicate the central frequency and spectrum width information of the corresponding node. According to the characteristics of wavelength continuity, in the case that the end-to-end frequency slot channel does not use a wavelength converter (OEO), the spectra used by all the nodes are the same. Therefore in the case of no wavelength converter, the values of Label 1, Label 2, Label 3 and Label 4 are the same.

In step 3: the path establishment module in the ingress node uses a signaling for establishing one end-to-end frequency slot channel according to the received PCRep message. Wherein, the signaling may be an existing signaling which is not repeated herein.

In the present embodiment, a path computation element comprises a receiving module and a computing module, wherein:

the receiving module is configured to: receive a path computation request message sent by an ingress node, wherein, the path computation request message carries spectrum resource information needed for establishing a frequency slot channel requested by the ingress node;

the computing module is configured to: according to the spectrum resource information sent by the ingress node and received by the receiving module, compute the frequency slot channel by combining of topology information of a network and spectrum resource information of each node in the network.

Alternatively, the path computation element further comprises a sending module, wherein:

the sending module is configured to: notify the ingress node of information of the frequency slot channel after the computing module computes out the frequency slot channel.

Alternatively, the sending module is configured to notify the ingress node of the information of the frequency slot channel in the following manner:

the sending module sending to the ingress node a path computation reply message which carries the information of the frequency slot channel.

Alternatively, the information of the frequency slot channel comprises: the routing information of the path and the spectrum resource information used for path establishment; wherein the spectrum resource information used for path establishment comprises: central frequency and spectrum width information of the frequency slot channel.

Furthermore, a node comprises a message construction module and a sending module when working as an ingress node in a process of establishing a frequency slot channel, wherein:

the message construction module is configured to: when a frequency slot channel needs to be established, construct a path computation request message which carries spectrum resource information needed for establishing the frequency slot channel;

the sending module is configured to: send the path computation request message constructed by the message construction module to a path computation element.

Alternatively, in the path computation request message, the spectrum resource information needed for establishing the frequency slot channel is carried via a spectrum width object; wherein, the spectrum width object comprises:

a field of Object-Class, used for identifying a path computation element protocol (PCEP) object type, and its specific numerical value is selected from any one of values which are not currently assigned;

a field of Object Type, when Object Type=1, it indicates the requested spectrum width;

when Object Type=2, it indicates requesting to reselect a better path;

a field of m: its value is used for indicating the spectrum width of the requested frequency slot channel, and the requested spectrum width is a product of 12.5 GHz and m.

Those ordinarily skilled in the art can understand that all or part of steps of the abovementioned method may be completed by the programs instructing the relevant hardware, and the programs may be stored in a computer-readable storage medium, such as read only memory, magnetic or optical disk. Alternatively, all or part of the steps of the abovementioned embodiments may also be implemented by using one or more integrated circuits. Accordingly, each module/element in the abovementioned embodiments may be realized in a form of hardware, or in a form of software function modules. The present document is not limited to any specific form of hardware and software combinations.

The above description is only preferred embodiments of the present document and not intended to limit the protection scope of the present document. According to the contents of the present document, there may also have a variety of other embodiments, and a person skilled in the art can make various appropriate modifications and variants according to the present document without departing from the spirit and essence of the present document. And any changes, equivalents and improvements made within the spirit and principle of the present document should be included within the protection scope of the present document.

INDUSTRIAL APPLICABILITY

With the abovementioned technical solution, the path computation element can compute a frequency slot channel with the determined central frequency according to the spectrum width information needed for path establishment. Therefore, the present document has very strong industrial applicability.

What is claimed is:

1. A method for computing a frequency slot channel, comprising:
    when a frequency slot channel needs to be established, an ingress node sending to a path computation element a path computation request message which carries spectrum resource information comprising spectrum width in units of GHz required by the ingress node to establish a frequency slot channel; and
    the path computation element computing out the frequency slot channel by combining the spectrum resource information required by the ingress node, topology information of a network and spectrum resource information of each node in the network;
    wherein:
    in the path computation request message, the spectrum resource information needed for establishing the frequency slot channel is carried via a spectrum width object; wherein, the spectrum width object comprises:
    a field of Object-Class, used for identifying a path computation element protocol (PCEP) object type, and its specific numerical value is selected from any one of values which are not currently assigned;
    a field of Object Type,
    when Object Type=1, it indicates the requested spectrum width;
    when Object Type=2, it indicates requesting to reselect a better path;
    a field of m: its value is used for indicating the spectrum width of the requested frequency slot channel, and the requested spectrum width is a product of 12.5 GHz and m.

2. The method of claim 1, wherein, the method further comprises:
    after computing the frequency slot channel, the path computation element notifying the ingress node of information of the frequency slot channel.

3. The method of claim 2, wherein, the step of the path computation element notifying the ingress node of the information of the frequency slot channel comprises:
    the path computation element sending the ingress node a path computation reply message which carries the information of the frequency slot channel.

4. The method of claim 1, wherein:
    information of the frequency slot channel comprises: routing information of the frequency slot channel and spectrum resource information used for path establishment.

5. A path computation element, comprising a receiving module and a computing module, wherein:
    the receiving module is configured to: receive a path computation request message sent by an ingress node, wherein, the path computation request message carries spectrum resource information comprising spectrum width in units of GHz required by the ingress node to establish a frequency slot channel; and
    the computing module is configured to: compute the frequency slot channel by combining the spectrum resource information required by the ingress node, topology information of a network and spectrum resource information of each node in the network;
    wherein:
    in the path computation request message, the spectrum resource information needed for establishing the frequency slot channel is carried via a spectrum width object; wherein, the spectrum width object comprises:
    a field of Object-Class, used for identifying a path computation element protocol (PCEP) object type, and its specific numerical value is selected from any one of values which are not currently assigned;
    a field of Object Type,
    when Object Type=1, it indicates the requested spectrum width;
    when Object Type=2, it indicates requesting to reselect a better path;
    a field of m: its value is used for indicating the spectrum width of the requested frequency slot channel, and the requested spectrum width is a product of 12.5 GHz and m.

6. The path computation element of claim 5, further comprising a sending module, wherein:
    the sending module is configured to: notify the ingress node of information of the frequency slot channel after the computing module computes out the frequency slot channel.

7. The path computation element of claim 6, wherein, the sending module is configured to notify the ingress node of the information of the frequency slot channel in the following manner:
    the sending module sending to the ingress node a path computation reply message which carries the information of the frequency slot channel.

8. The path computation element of claim 5, wherein:
    information of the frequency slot channel comprises: routing information of the path and spectrum resource information used for path establishment.

9. A node, comprising a message construction module and a sending module when working as an ingress node in a process of establishing a frequency slot channel, wherein:
    the message construction module is configured to: when a frequency slot channel needs to be established, construct a path computation request message which carries spectrum resource information comprising spectrum width in units of GHz required by the ingress node to establish a frequency slot channel; and
    the sending module is configured to: send the path computation request message constructed by the message construction module to a path computation element, so that the path computation element computes the frequency slot channel by considering the spectrum resource information required by the ingress node;
    wherein:
    in the path computation request message, the spectrum resource information needed for establishing the frequency slot channel is carried via a spectrum width object; wherein, the spectrum width object comprises:
    a field of Object-Class, used for identifying a path computation element protocol (PCEP) object type, and its specific numerical value is selected from any one of values which are not currently assigned;
    a field of Object Type,
    when Object Type=1, it indicates the requested spectrum width;

when Object Type=2, it indicates requesting to reselect a better path;

a field of m: its value is used for indicating the spectrum width of the requested frequency slot channel, and the requested spectrum width is a product of 12.5 GHz and m.

10. The method of claim 2, wherein:

the information of the frequency slot channel comprises: routing information of the frequency slot channel and spectrum resource information used for path establishment.

11. The method of claim 3, wherein:

the information of the frequency slot channel comprises: routing information of the frequency slot channel and spectrum resource information used for path establishment.

12. The path computation element of claim 6, wherein:

the information of the frequency slot channel comprises: routing information of the path and spectrum resource information used for path establishment.

13. The path computation element of claim 7, wherein:

the information of the frequency slot channel comprises: routing information of the path and spectrum resource information used for path establishment.

* * * * *